(12) United States Patent
Jain

(10) Patent No.: US 9,154,984 B1
(45) Date of Patent: Oct. 6, 2015

(54) SYSTEM AND METHOD FOR ESTIMATING NETWORK PERFORMANCE

(75) Inventor: Arvind Jain, Los Altos, CA (US)

(73) Assignee: Google Inc., Mountain View, CA (US)

( * ) Notice: Subject to any disclaimer, the term of this patent is extended or adjusted under 35 U.S.C. 154(b) by 539 days.

(21) Appl. No.: 13/296,505

(22) Filed: Nov. 15, 2011

(51) Int. Cl.
*H04W 24/10* (2009.01)
*H04W 40/24* (2009.01)
*H04L 12/24* (2006.01)

(52) U.S. Cl.
CPC ............ *H04W 24/10* (2013.01); *H04L 41/147* (2013.01); *H04W 40/248* (2013.01)

(58) Field of Classification Search
None
See application file for complete search history.

(56) References Cited

U.S. PATENT DOCUMENTS

| | | | | |
|---|---|---|---|---|
| 5,398,276 | A * | 3/1995 | Lemke et al. | 379/21 |
| 6,014,565 | A * | 1/2000 | Bonta | 455/437 |
| 6,219,544 | B1 * | 4/2001 | Suutarinen | 455/423 |
| 6,385,454 | B1 * | 5/2002 | Bahl et al. | 455/450 |
| 6,799,047 | B1 * | 9/2004 | Bahl et al. | 455/456.1 |
| 6,839,560 | B1 * | 1/2005 | Bahl et al. | 455/456.1 |
| 6,957,074 | B2 * | 10/2005 | Wang et al. | 455/456.1 |
| 6,973,622 | B1 * | 12/2005 | Rappaport et al. | 715/735 |
| 7,020,468 | B2 * | 3/2006 | Squibbs et al. | 455/445 |
| 7,096,160 | B2 * | 8/2006 | Skidmore et al. | 702/186 |
| 7,228,137 | B2 * | 6/2007 | Chinomi et al. | 455/456.1 |
| 7,236,462 | B2 * | 6/2007 | Davenport et al. | 370/252 |
| 7,246,007 | B2 * | 7/2007 | Ferman | 701/409 |
| 7,257,405 | B2 * | 8/2007 | Yamato et al. | 455/445 |
| 7,295,119 | B2 * | 11/2007 | Rappaport et al. | 340/572.4 |
| 7,295,960 | B2 * | 11/2007 | Rappaport et al. | 703/13 |
| 7,305,302 | B2 * | 12/2007 | Kaplan | 701/532 |
| 7,305,464 | B2 * | 12/2007 | Phillipi et al. | 709/223 |
| 7,315,739 | B2 * | 1/2008 | Burch et al. | 455/420 |
| 7,392,017 | B2 * | 6/2008 | Chu et al. | 455/67.11 |
| 7,463,890 | B2 * | 12/2008 | Herz et al. | 455/445 |
| 7,466,986 | B2 * | 12/2008 | Halcrow et al. | 455/456.2 |
| 7,522,918 | B2 * | 4/2009 | Wachter et al. | 455/423 |
| 7,646,712 | B2 * | 1/2010 | Cohen et al. | 370/230 |
| 7,765,294 | B2 * | 7/2010 | Edwards et al. | 709/224 |
| 7,769,850 | B2 * | 8/2010 | Silverman | 709/224 |
| 7,792,051 | B2 * | 9/2010 | Aaron et al. | 370/252 |
| 7,809,360 | B2 * | 10/2010 | Agrawal et al. | 455/414.1 |
| 7,933,557 | B1 * | 4/2011 | Townley et al. | 455/67.11 |
| 7,933,592 | B2 * | 4/2011 | Johnson et al. | 455/424 |
| 8,045,996 | B2 * | 10/2011 | Brunner et al. | 455/456.1 |
| 8,065,508 | B2 * | 11/2011 | Rubin et al. | 713/1 |
| 8,072,353 | B2 * | 12/2011 | Lamont et al. | 340/988 |
| 8,099,106 | B2 * | 1/2012 | Soliman et al. | 455/456.3 |

(Continued)

*Primary Examiner* — Greg C Bengzon
(74) *Attorney, Agent, or Firm* — Faegre Baker Daniels LLP

(57) ABSTRACT

The present disclosure is directed to techniques for estimating network performance of a mobile device. The techniques include a performance logging module and a performance analysis module. The performance logging module logs realized network performance of previously performed network operations and the operational conditions of a mobile device at the time of the performed network operations. The performance analysis module receives requests to estimate network performance, the requests including the current condition of the mobile device at the time of the request. The performance analysis module determines a network performance estimate based on the current condition of the mobile device and the operational conditions of the previously performed network operations, and the realized network performances of the previously performed network operations. It is appreciated that the proposed techniques allow applications to execute faster, as the applications can tune network operations based on the network performance estimates.

30 Claims, 10 Drawing Sheets

(56) References Cited

U.S. PATENT DOCUMENTS

| | | | |
|---|---|---|---|
| 8,180,375 B2* | 5/2012 | Awad | 455/456.3 |
| 8,219,101 B2* | 7/2012 | Shin | 455/444 |
| 8,345,616 B2* | 1/2013 | Navda et al. | 370/329 |
| 8,433,250 B2* | 4/2013 | Bhattacharya et al. | 455/67.11 |
| 8,472,944 B2* | 6/2013 | Shah et al. | 455/424 |
| 8,498,609 B2* | 7/2013 | Hamabe et al. | 455/404.2 |
| 8,547,224 B2* | 10/2013 | Cho et al. | 340/539.13 |
| 8,594,701 B2* | 11/2013 | Pakzad | 455/456.1 |
| 8,755,821 B2* | 6/2014 | Brisebois et al. | 455/456.1 |
| 2002/0174217 A1 | 11/2002 | Anderson | |
| 2004/0259555 A1* | 12/2004 | Rappaport et al. | 455/446 |
| 2005/0003827 A1* | 1/2005 | Whelan | 455/454 |
| 2006/0026296 A1 | 2/2006 | Nagaraj | |
| 2006/0223529 A1* | 10/2006 | Yokota et al. | 455/433 |
| 2007/0115847 A1 | 5/2007 | Strutt et al. | |
| 2008/0049630 A1 | 2/2008 | Kozisek et al. | |
| 2008/0057978 A1* | 3/2008 | Karaoguz et al. | 455/456.3 |
| 2008/0084334 A1* | 4/2008 | Ballew | 340/990 |
| 2008/0248822 A1* | 10/2008 | Jarvinen et al. | 455/509 |
| 2008/0299954 A1* | 12/2008 | Wright et al. | 455/414.1 |
| 2009/0075651 A1* | 3/2009 | MacNaughtan et al. | 455/434 |
| 2010/0150009 A1 | 6/2010 | Mangs et al. | |
| 2010/0323715 A1 | 12/2010 | Winters | |
| 2011/0009056 A1* | 1/2011 | Hanson et al. | 455/9 |
| 2011/0102256 A1* | 5/2011 | Shen et al. | 342/357.31 |
| 2011/0103360 A1* | 5/2011 | Ku et al. | 370/338 |
| 2011/0130135 A1* | 6/2011 | Trigui | 455/423 |
| 2011/0143761 A1* | 6/2011 | Uusitalo et al. | 455/450 |
| 2011/0182238 A1* | 7/2011 | Marshall et al. | 370/328 |
| 2011/0250895 A1* | 10/2011 | Wohlert et al. | 455/445 |
| 2011/0310866 A1* | 12/2011 | Kennedy et al. | 370/338 |
| 2012/0310587 A1* | 12/2012 | Tu et al. | 702/141 |
| 2013/0196685 A1* | 8/2013 | Griff et al. | 455/456.1 |
| 2013/0197799 A1* | 8/2013 | Cho et al. | 701/430 |
| 2013/0237245 A1* | 9/2013 | Tinnakornsrisuphap et al. | 455/456.1 |
| 2014/0011513 A1* | 1/2014 | Watts et al. | 455/452.2 |
| 2014/0066076 A1* | 3/2014 | Abraham et al. | 455/440 |
| 2014/0141770 A1* | 5/2014 | Campos et al. | 455/426.1 |
| 2014/0192658 A1* | 7/2014 | Venkatraman et al. | 370/252 |

* cited by examiner

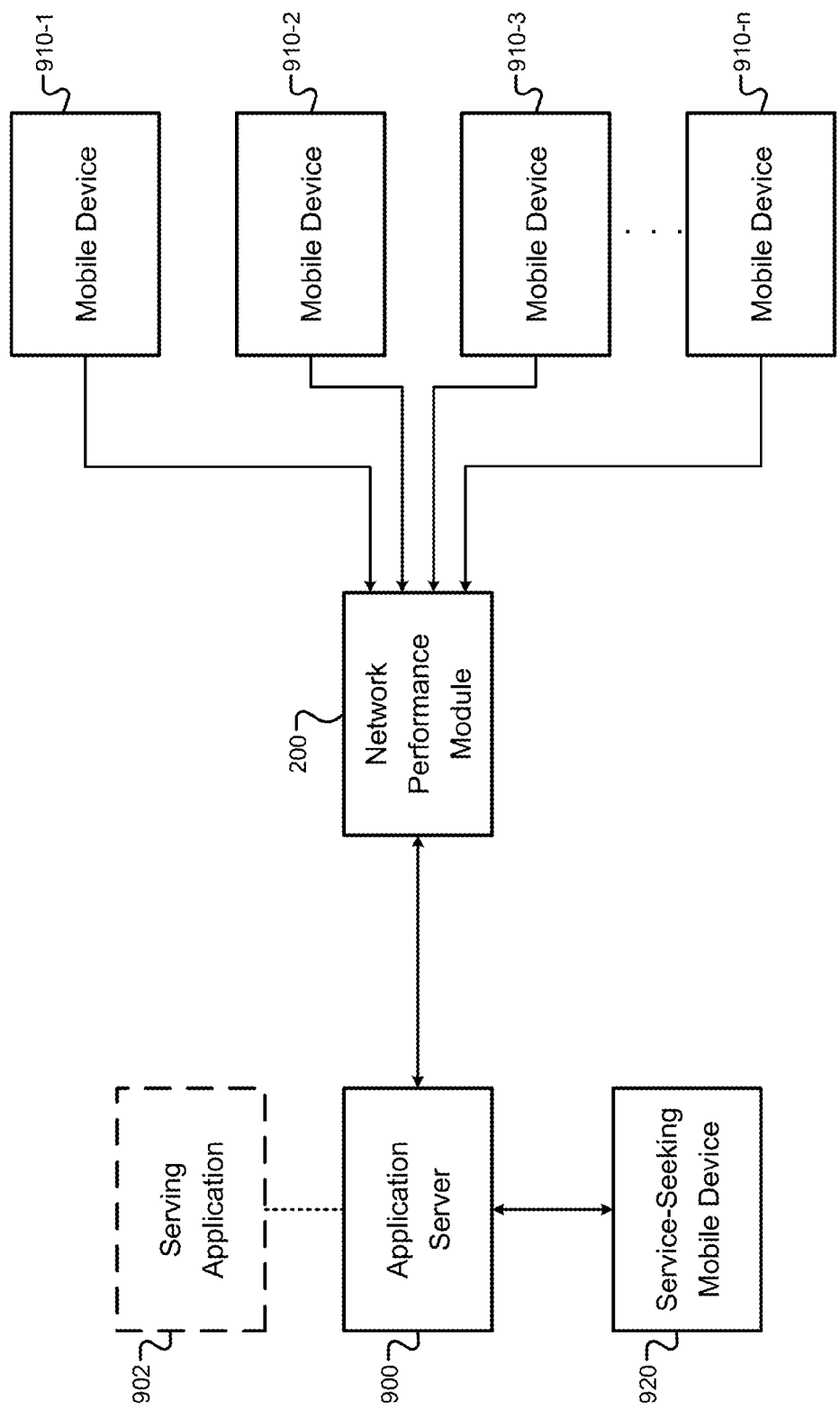

SYSTEM AND METHOD FOR ESTIMATING NETWORK PERFORMANCE

FIELD

The present disclosure generally relates to a method and system for estimating network performance.

BACKGROUND

This section provides background information related to the present disclosure which is not necessarily prior art.

Mobile devices are configured to execute a host of applications designed by a wide array of developers. Many of these applications are configured to send and receive data. For instance, such applications can include video streaming, audio streaming, video chat, file transfer, and messaging applications. The perceived quality of applications streaming large amounts of data can be adversely affected when the network performance, e.g., throughput or network delay, is suboptimal.

For example, a video streaming application may request a lower quality video stream or a photo sharing application may send a lower resolution photo when the network performance is suboptimal. These applications however try to determine the current network performance based solely on the current session or by performing diagnostics. Thus, if the application has just started executing or if the application has not been executing for a sufficient duration, the application cannot efficiently adjust network operations to compensate for the network condition of the mobile device. Thus, there is a need for an efficient means to estimate network performance.

SUMMARY

This section provides a general summary of the disclosure, and is not a comprehensive disclosure of its full scope or all of its features.

In various embodiments of the present disclosure, a system for estimating network performance of a mobile device is disclosed. The system includes a performance logging module configured to generate a plurality of performance log entries. Each performance log entry of the plurality of performance log entries is generated based on operational data received by the performance logging module, the operational data corresponding to a performed network operation performed by the mobile device. The operational data includes a) network condition data indicative of a condition of a network used to perform the performed network operation at a first time corresponding to the performed network operation, b) physical state data indicative of a physical condition of the mobile device at the first time, and c) realized network performance data indicative of at least one of a realized throughput of the performed network operation and a realized network delay of the performed network operation. The system further includes a network performance database configured to store the plurality of performance log entries generated by the performance logging module. The system further includes a performance analysis module configured to receive a request for a network performance estimate from the mobile device, the request including: a) current network condition data of the mobile device indicative of a current condition of the network at a second time corresponding to the request, and b) current physical state data indicative of a current physical condition of the mobile device at the second time. The performance analysis module is further configured to determine the network performance estimate based on the request and the plurality of performance log entries stored in the network performance database. The network performance estimate indicates at least one of an estimated throughput for a network operation to be performed and an estimated delay of the network operation to be performed.

In another aspect of the disclosure, a computer implemented method for estimating network performance is disclosed. The method includes receiving operational data corresponding to a network operation performed by the mobile device. The operational data of the performed network operation includes a) network condition data indicative of a condition of a network used to perform the performed network operation at a first time corresponding to the performed network operation, b) physical state data indicative of a physical condition of the mobile device at the first time, and c) realized network performance data indicative of at least one of a realized throughput of the performed network operation and a realized network delay of the performed network operation. The method further includes generating a performance log entry corresponding to the performed network operation based on the received operational data. The method further includes storing the performance log entry in a network performance database that stores a plurality of performance log entries. Each one of the performance log entries based on operational data corresponding to a different previously performed network operation. The method further includes receiving a request for a network performance estimate from the mobile device, the request including: a) current network condition data of the mobile device indicative of a current condition of the network at a second time corresponding to the request, and b) current physical state data indicative of a current physical condition of the mobile device at the second time. The method also includes determining the network performance estimate based on the request and the plurality of performance log entries stored in the network performance database. The network performance estimate indicates at least one of an estimated throughput for the network operation to be performed and an estimated delay of the network operation to be performed.

In another aspect of the present disclosure, a system for estimating network performance of a mobile device is disclosed. The system includes a performance logging module configured to generate a plurality of performance log entries. Each performance log entry of the plurality of performance log entries is generated based on operational data received by the performance logging module, the operational data corresponding to a performed network operation performed by the mobile device. The operational data includes a) network condition data indicative of a condition of a network used to perform the performed network operation at a first time corresponding to the performed network operation, b) physical state data indicative of a physical condition of the mobile device at the first time, and c) realized network performance data indicative of at least one of a realized throughput of the performed network operation and a realized network delay of the performed network operation. The system further includes a network performance database configured to store the plurality of performance log entries generated by the performance logging module. The system further includes a performance analysis module configured to receive a request for a network performance estimate from an application server that is to serve the service-seeking mobile device, the request including: a) current network condition data of the service-seeking mobile device indicative of a current condition of the network at a second time corresponding to the request, and b) current physical state data indicative of a current physical condition of the service-seeking mobile device at the second time. The performance analysis module is further configured to determine the network performance estimate based on the request and the plurality of performance log entries stored in the network performance database. The network performance estimate indicates at least one of an estimated throughput for a network operation to be performed and an estimated delay of the network operation to be performed. The performance analysis module is further configured to provide the network performance estimate to the application server.

In another aspect of the disclosure, a computer implemented method is disclosed. The method includes receiving, from a requestor, a request for a network performance estimate of a mobile device, determining current network condition data of the mobile device, and determining current physical state data of the mobile device. The method further includes accessing a plurality of performance log entries in a network performance database. Each of the plurality of performance log entries including previous network condition data corresponding to a previously performed network operation, previous physical state data corresponding to the previously performed network operation, and realized network performance data indicative of at least one of a realized throughput of the previously performed network operation and a realized network delay of the previously performed network operation. The method further includes identifying one or more performance log entries based on the current network condition data and the current physical state data, determining the network performance estimate based on the one or more identified performance log entries, and providing the network performance estimate to the requestor.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 9 is a block diagram illustrating an example environment of the system and method for the present disclosure including an application server in communication with a network performance module.

Corresponding reference numerals indicate corresponding parts throughout the several views of the drawings.

DETAILED DESCRIPTION

Example embodiments will now be described more fully with reference to the accompanying drawings.

Figure 1:
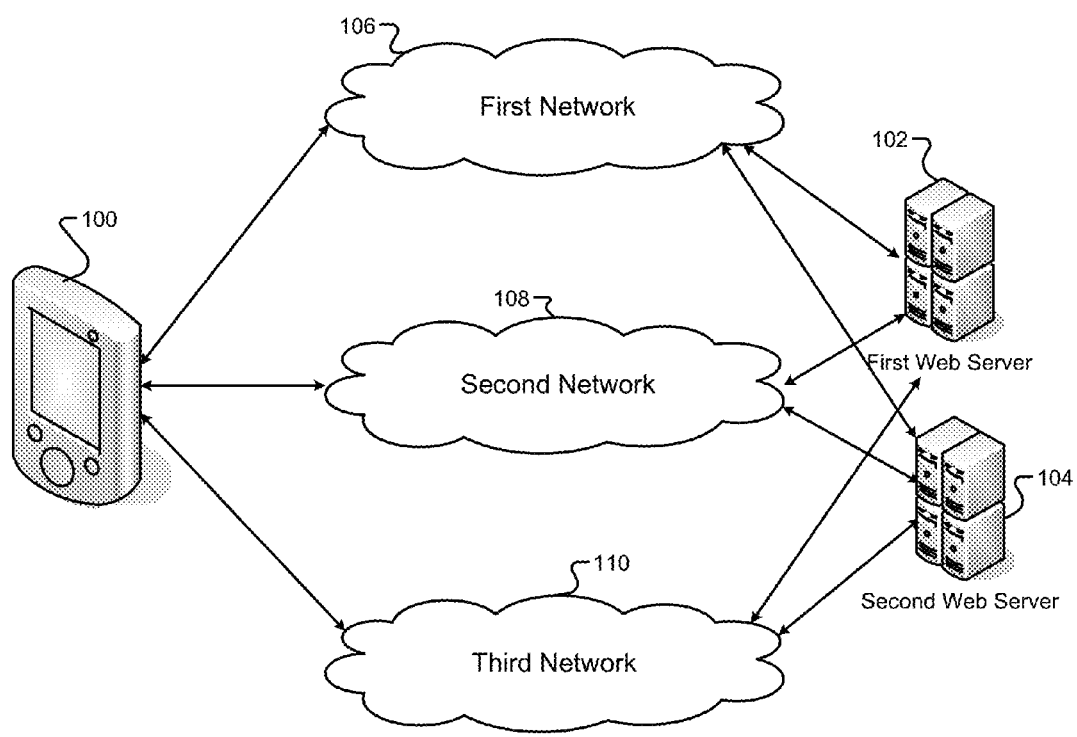
FIG. 1 is a drawing illustrating an example environment of the system and method for the present disclosure including a mobile device in communication with a plurality of web servers.

FIG. 1 illustrates an example environment of a mobile device 100 according to some embodiments of the present disclosure. The term mobile device 100 includes any portable user electronic devices that have communication enabled, e.g., mobile phone, smart phone, tablet computer, personal digital assistant (PDA), handheld gaming device, and laptop computer. The mobile device 100 may be configured to communicate with a plurality of different web servers 102 and 104. The mobile device 100 can include one or more antennas that enable the mobile device 100 to communicate with the web servers 102 and 104 over, for example, a first network 106, a second network 108, or a third network 110. The different networks represent different means for connecting to the internet. For instance, the mobile device 100 may be configured to connect to the internet using a fourth generation (4G) mobile telecommunications network, a third generation (3G) mobile telecommunications network, or a wireless local area network (WLAN).

Mobile device operating systems and applications aim to find the delicate balance between data quality and speed of service. In an ideal environment, mobile device 100 users would receive the highest resolution data instantaneously, i.e., ideal realized network performance. In practice, however, network performance is adversely affected by a number of factors. Thus, it is appreciated that a tool which allows a mobile device 100 to estimate network performance may be beneficial to the operation of the mobile device 100 and to other applications executing thereon. Network performance estimates may allow the operating system or application that is to perform a network application to tune the network operation based on the network performance estimate. For example, if a video streaming application is going to stream video from a content provider but the network performance estimates indicate that the throughput is less then optimal, the video streaming application can request a lower resolution stream from the content provider in order to improve the user experience. Similarly, if the network performance estimates indicate that the network performance is likely to be optimal or close to optimal, the video streaming application can request a high quality video stream.

Network performance can be measured in a number of metrics. For example, network performance of a performed network operation can be measured in terms of a realized throughput or a realized delay or latency (for purposes of explanation latency and delay will be collectively referred to as "delay"). A network operation includes any operation performed by the mobile device over a communications network, such as transmitting data to and/or receiving data from a web server. The realized throughput of a performed network operation can, for example, indicate the rate at which data is successfully delivered to or from the mobile device 100. The realized delay can include an amount of time for a packet to travel from the mobile device 100 to a node, e.g., the first web server 102, or vice-versa. The realized delay may also include a round-trip time for a data packet, that is—the amount of time that a packet travels from the mobile device 100 to a node and back to the mobile device 100.

There are many factors that can contribute to a realized network performance. These factors include a condition of the network at the time of a performed network operation and the physical condition of the mobile device 100 at the time of the performed network operation. Examples of a network condition include a network type, a signal strength at an antenna of the mobile device 100, a network name, and the network provider. The network type is the type of network on which the network operation is being performed, e.g., WLAN, 3G, or 4G. The signal strength is a measure of the magnitude of the signal used to receive communications from a network during the network operation. In some embodiments, the signal strength can be represented by a percentage indicating the current magnitude of a signal in comparison to an optimal magnitude for the signal. The network name is a name that indentifies the network being used to perform the network operation. For example, the mobile device 100 may have the option of connecting to a plurality of WLANs, such that each WLAN has a different name associated thereto. The physical state of the mobile device 100 describes the physical condition of the mobile device at the time of the performed network operations. For instance, the physical condition of the mobile device 100 can include the geographic location of the mobile device 100, whether the mobile device is indoors or outdoors, whether the mobile device 100 is static or in motion, and if in motion, the speed and/or direction of the mobile device 100. Additional information such as the time at the location of the mobile device and/or day of the week when a network operation was performed may also be included in the physical condition of the mobile device 100.

Further, factors specific to the mobile device 100, such as an operating system type, a operating system version, and an antenna device driver and/or firmware version may also impact the realized network performance. For purposes of explanation, these factors are collectively referred to as mobile device data.

Figure 2A:
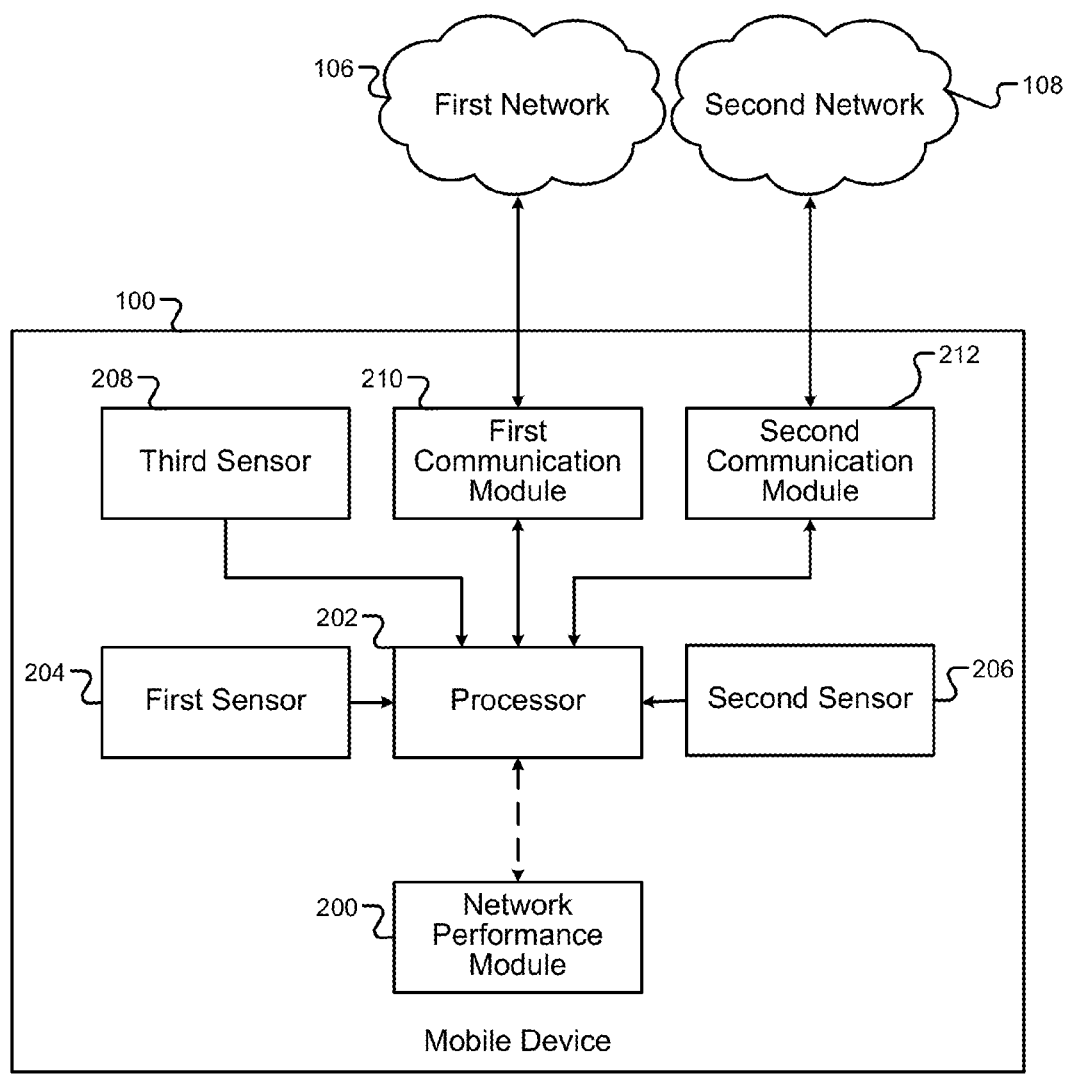
FIGS. 2A and 2B are block diagrams illustrating example components of a mobile device according to some embodiments of the present disclosure.
Figure 2B:
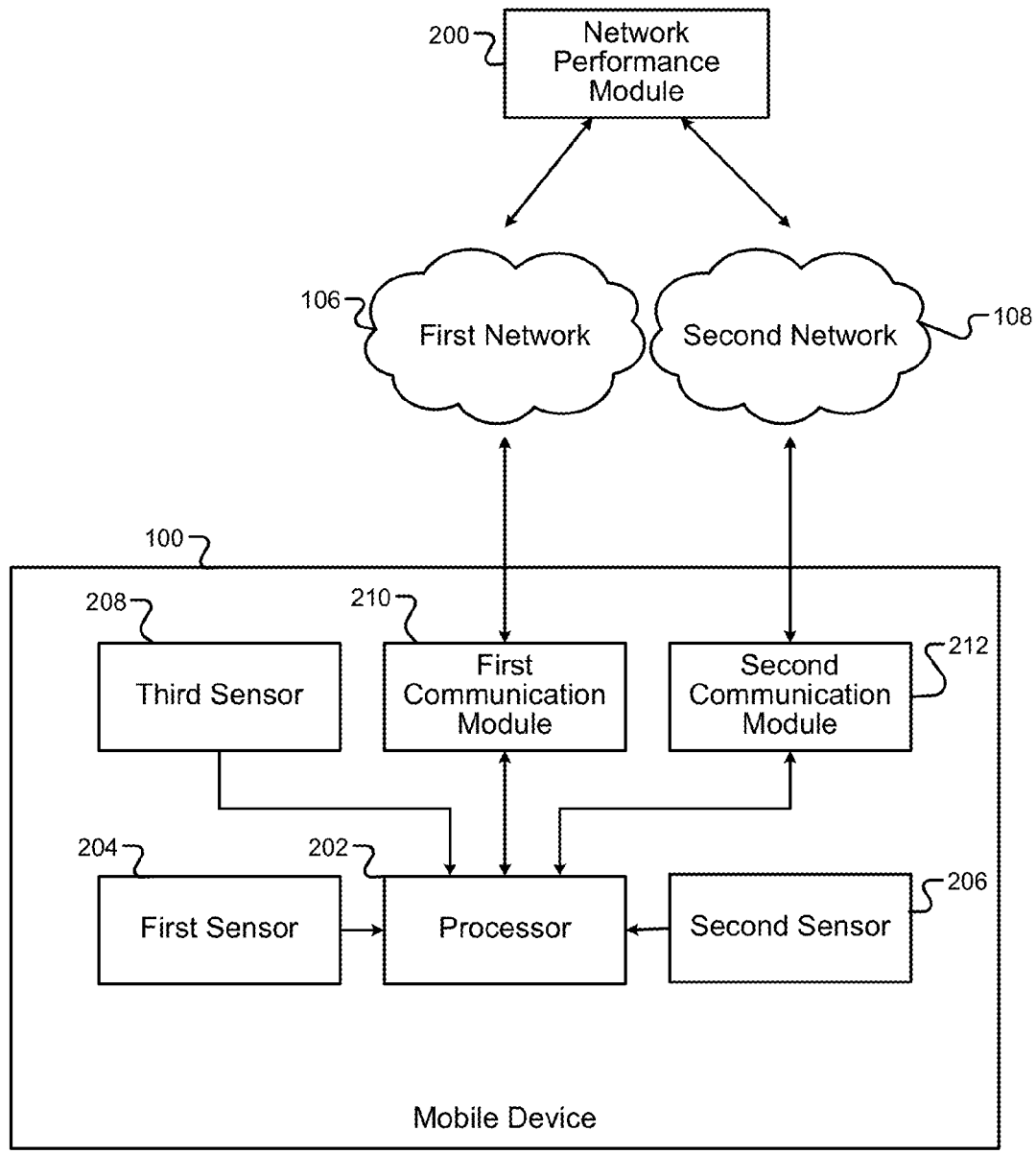

FIGS. 2A and 2B illustrate an example mobile device 100 configured to request network performance estimates. The example mobile device 100 includes a processor 202 operatively coupled to a first sensor 204, a second sensor 206, a third sensor 208, a first communication module 210, and a second communication module 212. The mobile device 100 may request network performance estimates from a network performance module 200. As will be described below, the network performance module 200 may be implemented on the mobile device 100 or at a remote server accessed over a network 106 or 108.

The network performance module 200 can log realized network performance data of performed network operations and estimate network performance for network operations that are to be performed. The network performance module 200 receives operational data collected by the mobile device 100 at a time of a performed network operation. The operational data may include network condition data indicative of the condition of a network at the time of a performed network operation, physical state data indicative of the physical condition of the mobile device 100 at the time of the performed network operation, and realized network performance data indicative of the realized network performance of the performed network operation. Examples of realized network performance can be a realized throughput of the performed network operation and a realized network delay of the performed network operation. The operational data can be obtained, for example, from the first sensor 204, the second sensor 206, the third sensor 208, the first communication module 210, or the second communication module 212. It is appreciated that the foregoing list is example in nature and the mobile device 100 can include additional components or alternative components and that the mobile device 100 can determine the operational data and the current condition data of the mobile device 100 in any suitable fashion. As will be described in greater detail below, the network performance module 200 logs the operational data, including the network performance data.

The network performance module 200 further receives requests for a network performance estimate from a requestor, e.g., the mobile device 100. The request for a network performance estimate can include current condition data indicating a current condition of the mobile device 100, including the current network condition and the current physical condition of the mobile device 100. The network performance module 200 uses the logged operation data of previous network operations to determine the estimate for an operation to be performed based on the current conditions of the mobile device 100.

The first sensor 204, second sensor 206, and third sensor 208 can be of any type of sensor sufficient to provide environmental data to the processor 202, including the physical state data. For instance, the first sensor 204 may be a photo sensor that monitors the intensity or type of lighting around the mobile device 100. The first sensor 204 can be used to gauge whether the mobile device 100 is indoors or outdoors based on the intensity or other characteristics of the observed light. The second sensor 206, for example, may be a global positioning system (GPS) sensor that provides location data to the processor 202. The third sensor 208 can be, for example, an accelerometer. The accelerometer provides motion data indicating the speed of a mobile device 100. It is appreciated that the third sensor 208 may further include or may be coupled to a directional sensor such as a compass that provides a direction of the mobile device 100, such that a velocity of the mobile device 100 can be provided to the processor 202. Additional sensors can also be integrated into the mobile device 100 in addition to the first sensor 204, second sensor 206, and third sensor 208. The types of sensors used provided in the above example are not intended to be limiting in any way.

The mobile device 100 can further include a first communication module 210 and a second communication module 212. The first communication module 210 is configured to communicate over a first network 106 and the second communication module 212 is configured to communicate over a second network 108. It is appreciated that the communication modules 210 and 212 may each include one or more antennas and a corresponding device driver and/or firmware that in combination effectuate communication over the respective network. It is appreciated that the communication modules 210 and 212 can be configured to communicate over any suitable network type, now known or later developed.

In some embodiments, the first communication module 210 may be configured to communicate over a WLAN and the second communication module 212 may be configured to communicate over a cellular network, e.g., 3G, 4G, or later developed networks. It is further noted, that the mobile device 100 may further include additional communication modules (not shown) which can communicate over additional communications networks. For example, a mobile device 100 may have capabilities to communicate using WLAN, 3G cellular networks, and 4G cellular networks, each of which may require separate antennas.

The first communication module 210 and the second communication module 212 are configured to provide the network condition data and the realized network performance data to the processor 202. For instance, the first communication module 210 can provide the signal strength at the current time, the network type and/or name that the mobile device 100 is connected to, and an identifier of the network provider. It is appreciated that depending on the type of network, some of the fields, such as network provider or network name may not be applicable. It is further appreciated that the communication modules 210 and 212 may provide additional types of network condition data. Furthermore, after a network operation is performed, the first communication module 210 or second communication module 212 may determine the realized throughput and/or the realized of the performed network operation.

Referring to FIG. 2A, in some embodiments the network performance module 200 is executed by the processor 202 of the mobile device 100. In these embodiments, the network performance module 200 is dedicated to the mobile device 100 and receives requests from the mobile device 100. Alternatively, referring to FIG. 2B, in some embodiments the network performance module 200 is executed by the processor of a remote server (not shown), or "from the cloud." In these embodiments, the network performance module 200 can be accessible by a plurality of mobile devices, including mobile device 100. Thus, the network performance module 200 can log and aggregate the operational data of a plurality mobile devices. When a mobile device 100 of the plurality of mobile devices requests a network performance estimate, the network performance module 200 can base the network performance estimate on the aggregated operational data of the plurality of mobile devices. It is further appreciated, that the network performance module 200 can be distributed between the mobile device 100 and a remote server, such that a first portion of the tasks performed by the network performance module 200 are performed at the mobile device and a second portion of the tasks are performed at the remote server.

In embodiments where the network performance module 200 is configured to log operational data from a plurality of mobile devices, the network performance module 200 can log additional types of data. For instance, the network performance module 200 can log mobile device data, i.e., data that corresponds to properties and/or specifications of the mobile device 100 itself. Mobile device data can include the make and model of the mobile device 100, an operating system executing on the mobile device 100, the version number of the operating system, different hardware components of the mobile device 100 such as an antenna type, and current device drivers or firmware versions for components of the mobile device 100.

Mobile device data may also help mobile device manufacturers and users troubleshoot current configurations of the mobile device 100. For example, if a mobile device manufacturer observes that better network performances are observed for an earlier device driver for an antenna, the mobile device manufacturer can use this information to improve later versions of the device driver or to recommend downgrading device drivers to users.

Figure 3:
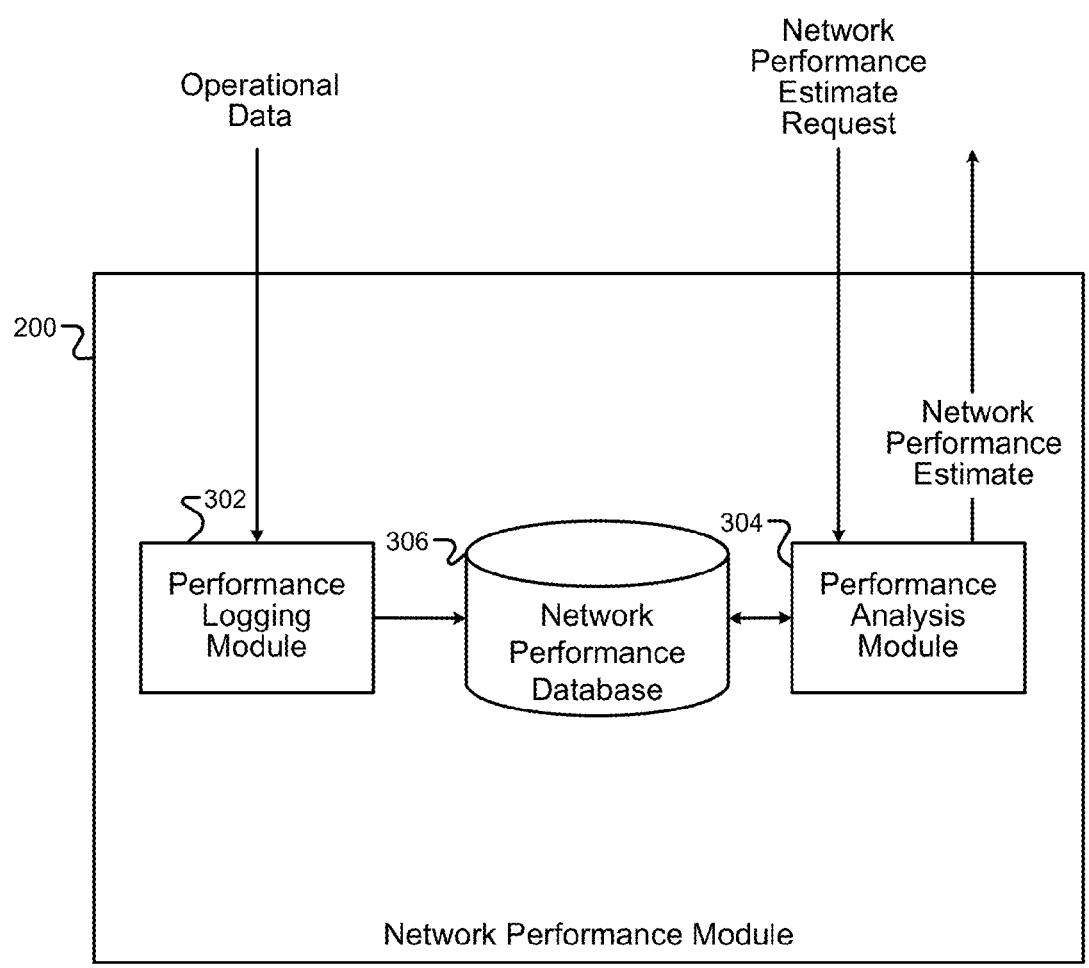
FIG. 3 is a block diagram illustrating example components of a network performance module according to some embodiments of the present disclosure.

Referring now to FIG. 3, an example embodiment of the network performance module 200 according to some embodiments of the present disclosure is depicted. In an example embodiment, the network performance module 200 includes a performance logging module 302, a performance analysis module 304, and a network performance database 306. The performance logging module 302 receives operational data from the mobile device 100 and logs the operational data in the network performance database 306. The performance analysis module 304 receives requests for a network performance estimate from the mobile device 100 and determines a network performance estimate based on current condition data indicated in the request and the contents of the network performance database 306.

As discussed above, the network performance module 200 can be used by the operating system and/or by various applications to estimate network performance before performing a network operation. The operating system or an application will provide the network performance module 200 with a request for a network performance estimate. The request can be, for example, embodied as an instruction that is part of a network application programming interface (API). The request is received by the performance analysis module 304, which in turn determines and returns a network performance estimate to the requesting application.

Figure 4:
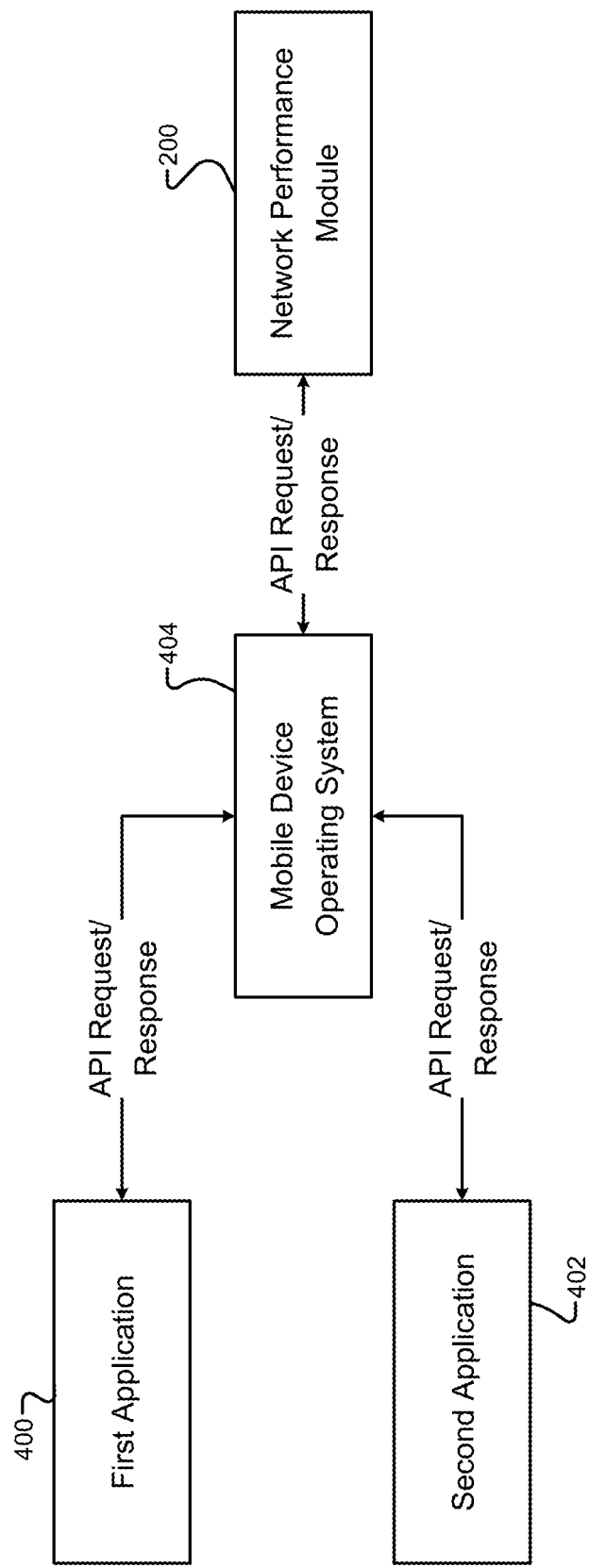
FIG. 4 is a block diagram illustrating an example of how an instruction requesting a network performance estimate can be provided to the network performance module according to some embodiments of the present disclosure.

FIG. 4 illustrates an example of API requests being provided to the network performance module 200, and in particular, to the performance analysis module 304. In the example, a first application 400 and a second application 402 are executed by the operating system 404 of the mobile device 100. The first and second applications 400 and 402 are configured to perform network operations. Typically, when an application, e.g., the first application 400, performs a network operation, the application 400 will initiate the network operation via the operating system 404. Thus, prior to performing the network operation, the application 400 issues an API request for a network performance estimate. The API request is provided to the operating system 404, which provides the request to the network performance module 200. An example API is provided below:

getThroughputAndDelay([IN] curr_conditions, [OUT] Throughput, [OUT] delay); where the current condition data is provided as input, and the estimated throughput and delay are returned as output. As will be discussed below, the throughput and delay can be provided as single values, e.g., median or mean values, or as distributions of values.

Figure 5:
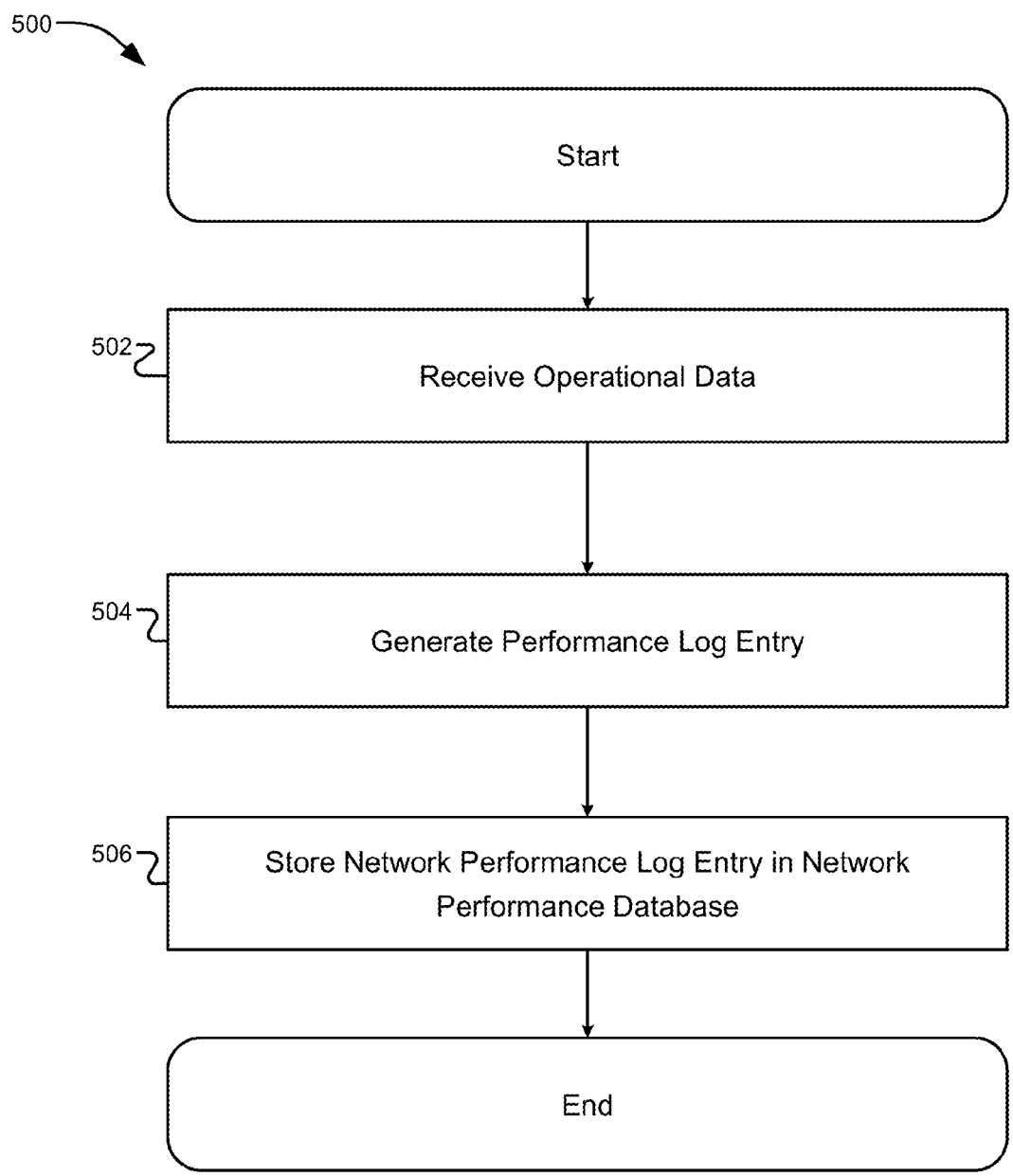
FIG. 5 is a flow chart illustrating example steps for logging operational data in a network performance database according to some embodiments of the present disclosure.

As mentioned, the performance logging module 302 receives operational data from one or more mobile devices 100 and logs the operational data in the network performance database 306. FIG. 5 illustrates an example method 500 that can be executed by the performance logging module 302 for logging operational data, including realized network performance data. As shown at step 502, the performance logging module 302 receives the operational data from the mobile device 100. The mobile device 100 can provide the operational data to the performance logging module 302, for example, upon performing a network operation. The mobile device 100 determines the network condition data at the time of the performed network operation, the physical state data at the time of the performed network operation data, and the realized network performance data corresponding to the performed network operation.

In determining the network condition data, the mobile device 100 can determine, for example, the signal strength at the time of the network operation, network type used to perform the network operation, and/or the network name. In determining the physical state data, the mobile device 100 can determine, for example, whether the mobile device 100 was indoors or outdoors at the time of the operation, the speed of the mobile device 100 at the time of the operation, the geographic location of the device at the time of the operation, the time at which the network operation was performed, and/or the day of the week on which the network operation was performed. In determining the realized network performance data, the mobile device 100 can determine, for example, the realized throughput and realized delay. The mobile device 100 then provides the operational data to the performance logging module 302. In some embodiments, the operational data may also identify a type of operation performed. As previously mentioned, in the embodiments where the performance logging module 302 receives operational data from a plurality of mobile devices, the received operational data may further include mobile device data indicative of information specific to the mobile device 100.

As was discussed, the network performance module 200 may be executed by the mobile device 100 or from a dedicated server, i.e., from the cloud. When receiving operational data from the mobile device 100, the performance logging module 302 may actually be receiving the operational data from the operating system of the mobile device 100 or an application executing on the mobile device 100. The term receiving data from the mobile device 100 is meant to include situations where the network performance module 200 is embodied on the mobile device 100 and/or served from the cloud. Thus, the network performance module 200 may be implemented on the mobile device 100 and is still said to receive operational data from the mobile device 100.

Figure 6:
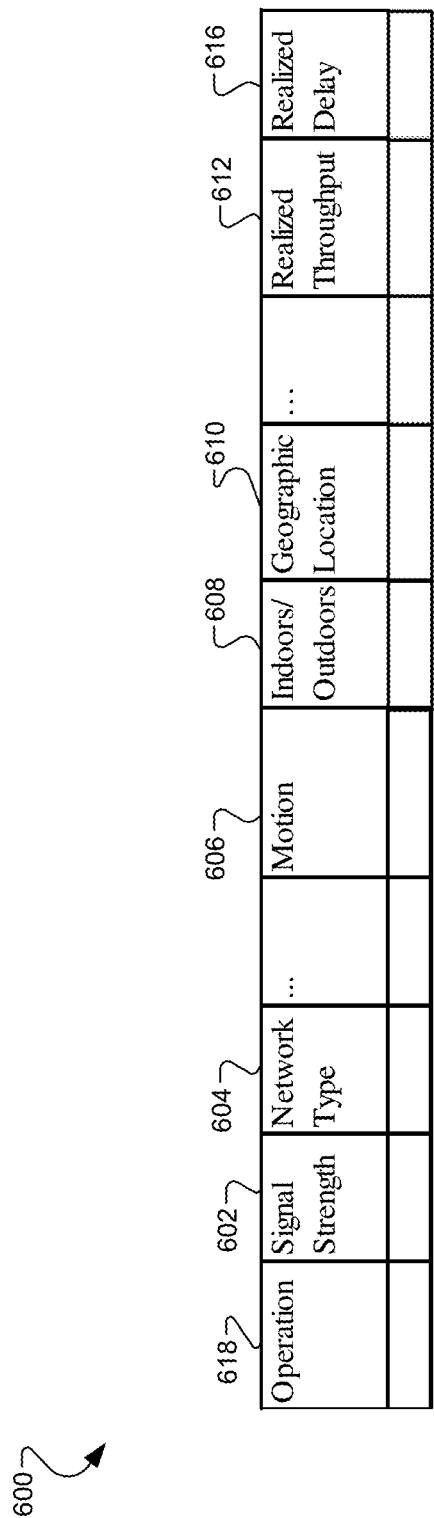
FIG. 6 is a graphical representation illustrating an example entry in the network performance database according to some embodiments of the present disclosure.

Upon receiving the operational data of a particular performed network operation, the performance logging module 302 generates a performance log entry (step 504) and stores the performance log entry in the network performance database 306 (step 506). FIG. 6 illustrates an example performance log entry 600 according to some embodiments of the present disclosure. It should be appreciated that the performance log entry 600 can be any data structure sufficient for storage in the network performance database 306. The network performance database 306 is configured to store a plurality of performance log entries 600. A performance log entry 600 includes operational data corresponding to a performed network operation. An example performance log entry 600 can include a plurality of elements, including elements such as a signal strength element 602, a network type element 604, a motion element 606, an indoor/outdoor flag 608, and a geographic location element 610. Further, an operation element 618 may indicate the type of network operation that was performed. As can be appreciated, the signal strength element 602 can indicate a signal strength value at the time of a corresponding network operation, typically measured as a percentage. The network type element 604 can indicate what type of network was used to perform the network operation. The motion element 606 can indicate whether the mobile device 100 was in motion at the time of the network operation, and if so, the speed of the mobile device 100 at the time of the network operation. The geographic location element 610 may include a longitude value and latitude value, such that the location of the mobile device 100 at the time of the network operation is logged. It is appreciated that other operational data may be represented in the performance log entry 600, such as the type of network operation that was performed, the time at which a network operation was performed, and a day on which the network operation was performed.

The performance log entry 600 further includes elements for one or more network performance metrics. For instance, the performance log entry 600 may include a realized throughput element 614 and a realized delay element 616. The realized throughput element 614 indicates the realized throughput for the performed network operation. The realized throughput can be represented by an amount of data per unit of time, such as megabytes per second. The realized delay element 616 indicates the realized delay for the performed network operation. The realized delay can be represented by an amount of time, such as milliseconds.

In some alternative embodiments, the network performance database 306 may be arranged into a plurality of "bins." A bin can be thought of as a function of a specific combination of different operational data types and corresponding values. In these embodiments, a performance log entry may include the realized network performance data. The performance log entry for a performed network operation is stored in a particular bin based on the network condition data values corresponding to the performed network operation and the physical state condition values corresponding to the performed network operation. As can be appreciated, a subset of the operational data types is discretized. For instance, a network name, whether a device is indoors, and the network types are all discretized data types. Other data types are continuous, such as signal strength and the speed of the mobile device 100. The continuous operational data types are discretized into ranges. For example, signal strength can be divided into 10 ranges. For instance, the signal strength could be broken into the following ranges of a signal strength S:

$0<S\leq10$
$10<S\leq20$
$20<S\leq30$
$30<S\leq40$
$40<S\leq50$
$50<S\leq60$
$60<S\leq70$
$70<S\leq80$
$80<S\leq90$
$90<S\leq100$.

It is appreciated that the forgoing ranges are examples and that any set of ranges can be used to express signal strength.

Figure 7:
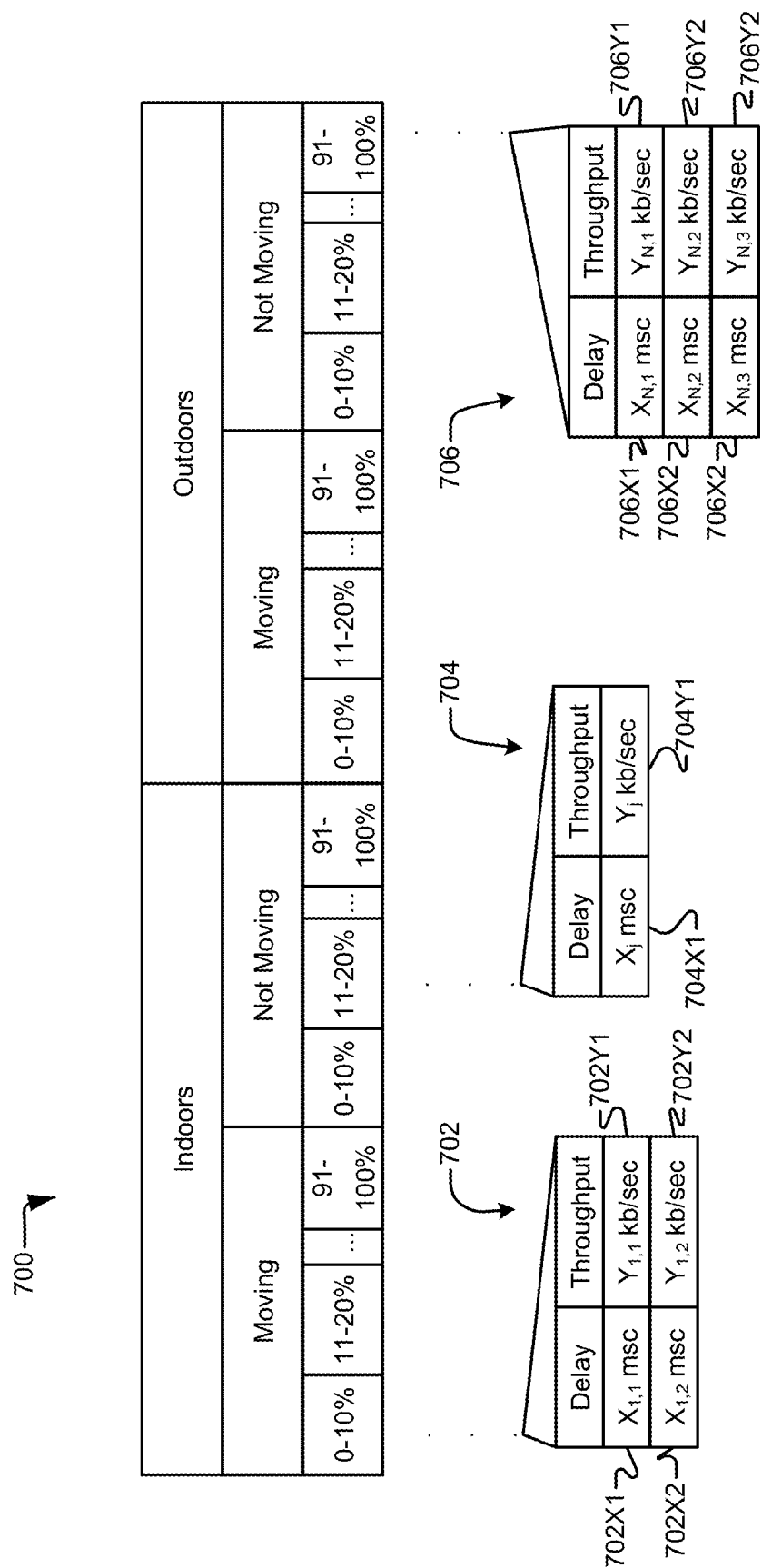
FIG. 7 is a graphical representation illustrating an example of how network performance data may be referenced in some embodiments according to some embodiments of the present disclosure.

FIG. 7 illustrates an example structure of a network performance database 306 arranged into a plurality of bins. In the example, a first bin 702, a Jth bin 704, and an Nth bin 706 are depicted, where J and N are integers, and N is the total number of bins. Each bin can have zero or more network performance log entries associated thereto. For example, there are two network performance log entries associated to the first bin 702. The first network performance log entry includes a first delay value 702X1 and a second throughput value 702Y1 and the second network performance log entry includes a first delay value 702X2 and a second throughput value 702Y2. In this example, there is one network performance log entry associated to the Jth bin 704, and three network performance log entries associated to the Nth bin 706.

For purposes of explanation only, it is assumed that there are three types of operational data in the example of FIG. 7. In the example, the three types of operational data are (1) whether the mobile device 100 was indoors or outdoors at the time of the performed network operation, (2) whether the mobile device 100 was in motion at the time of the performed network operation, and (3) the signal strength of the mobile device 100 at the time of the performed network operation. Each bin of the N bins (in this example there would be 40 bins) corresponds to a particular combination of operational data values. The first bin 702 corresponds to performed network operations that were performed while the mobile device 100 was indoors, moving, and the signal strength was between 0% and 10%. The Jth bin 704 corresponds to performed network operations that were performed when the mobile device 100 was indoors, not moving, and the signal strength was between 11% and 20%. The Nth bin 706 corresponds to performed network operations that were performed while the mobile device 100 was outdoors, not moving, and the signal strength was between 91% and 100%. It is appreciated that the foregoing example is not intended to be limiting. Any number of operation data types may be used to implement the foregoing configuration of the network performance database 306.

Referring back to FIG. 5, the network performance log entries can be generated and stored in any other suitable manner. The method depicted in FIG. 5 can execute each time a network operation is performed, or can be done at predetermined intervals, such that batches of network performance log entries are stored at a single time. In either case, the performance logging module 302 generates a plurality of network performance log entries that are stored in the network performance database 306. Further, it is appreciated that variations of the method are contemplated and are within the scope of the disclosure.

Before a network operation is performed, the operating system or application that is to perform the network operation can request a network performance estimate from the network performance module 200. The request can indicate current conditions of the mobile device 100. The network performance module 200 responds with a network performance estimate that is based on the current conditions of the mobile device 100 and the performance log entries stored in the network performance database 306.

Figure 8:
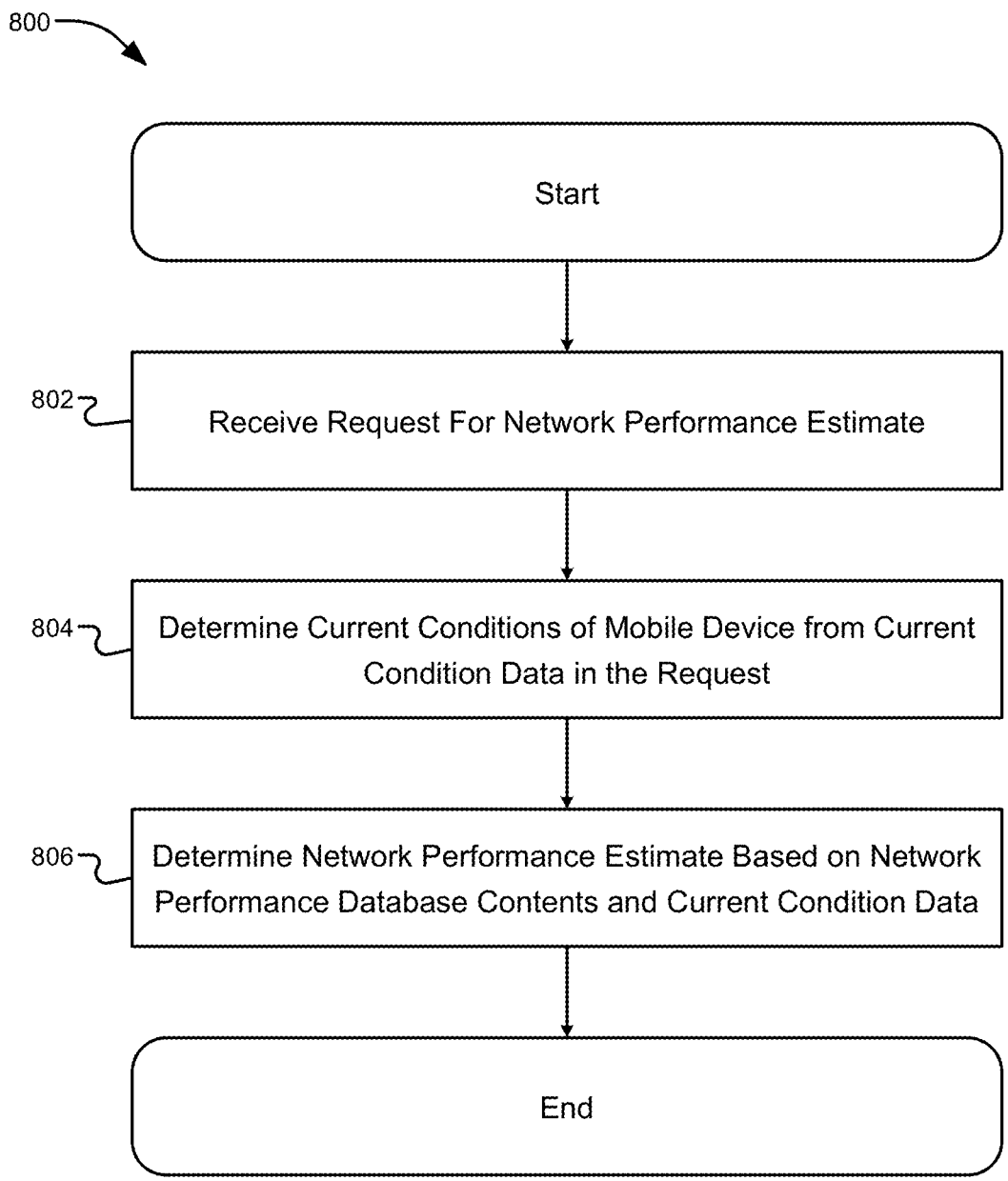
FIG. 8 is a flow chart illustrating a method for honoring a request for a network performance estimate according to some embodiments of the present disclosure.

FIG. 8 illustrates an example method 800 for determining a network performance estimate. As shown at step 802, the performance analysis module 304 receives a request for a network performance estimate. As previously discussed, an application or the operating system of the mobile device 100 issues the request for a network performance estimate to the performance analysis module 304. As previously discussed, the request can be issued using an API request, such that prior to performing a network operation, the application or operating system will invoke the API instruction.

Upon receiving the request, the performance analysis module 304 reads the current condition data of the mobile device 100 from the request (step 804) and determines a network performance estimate based on the contents of the network performance database 306 and the current condition data received in the request (step 806). The current condition data of the mobile device 100 can be obtained by the mobile device 100 from the first sensor 204, the second sensor 206, the third sensor 208, the first communication module 210, and/or the second communication module 212. The current condition data is included in the request, such that the performance analysis module 304 uses the current condition data to determine the network performance estimate.

As discussed above, in some embodiments the network performance database 306 is arranged in bins corresponding to different combinations of operational data values. In these embodiments, the current condition data of the mobile device 100 received in the request is used to determine a bin corresponding to the current condition data. If more than one network performance log entry is stored in the bin corresponding to the current condition data, the performance analysis module 304 can determine a mean or median of the network performance data values stored in the bin. For instance, the performance analysis module 304 can provide the mean throughput and mean delay for the performance log entries stored in a particular bin. Furthermore, realized throughputs and/or delays of more recently performed network operations may be weighted more greatly than older realized throughputs and/or delays, such that a weighted average may be calculated. In some embodiments, the performance analysis module 304 may provide a distribution of throughput values and delay values.

In some embodiments, the performance analysis module 304 can execute a classification algorithm on the contents of the network performance database 306 and try to find a set of network performance log entries that are the most similar to the current condition data. For instance, the performance analysis module 304 can perform a "k nearest-neighbor" search on the network performance database 306. In these embodiments, the performance analysis module 304 will calculate distances from each of the network performance entries in the network performance database 306. The performance analysis module 304 then selects K network performance entries based on the calculated distances, where K is a predetermined value. Network performance estimates can be determined from the network performance data of the K network performance entries. For example, the network performance estimates may be a mean value or median value of the throughput and delay values of the K network performance entries. The performance analysis module 304 then returns the network performance estimates to the requesting entity.

It is appreciated that other suitable methods can be used to determine a network performance estimate and are within the scope of this disclosure. The method illustrated in FIG. 8 is example and not intended to be limiting.

A mobile device 100, and in particular the operating system or applications executing on the mobile device 100, can use network performance estimates for any suitable reason. For instance, a video streaming application may request a lower quality video stream in response to a network performance estimate indicating suboptimal network conditions. As described above, requests for network performance estimates can be embodied as part of an API. By making such an API request available to developers, developers of applications can choose on how best to optimize their respective applications based on received network performance estimates.

It is appreciated that while the foregoing disclosure describes a situation where the requestor of a network performance estimate is the mobile device 100, the foregoing disclosure includes embodiments where the requestor is a serving application that is serving a service-seeking mobile device. FIG. 9 illustrates an example embodiment where the network performance module 200 is configured to receive requests for a network performance estimate from an application server 900 executing a serving application 902, e.g., a video or audio streaming application. The network performance module 200 is further configured to receive operational data from a plurality of mobile devices 910-1, 910-2, 910-3 . . . 910-n (herein referred to as mobile devices 910).

In the illustrated example, the serving application receives requests for service from a service-seeking mobile device 920. The service-seeking mobile device 920 may provide its location and/or network to the serving application 902 in the request for service. The serving application 902, executing on the application server 900, may request a network performance estimate from the network performance module 200. The request may include current operational data of the service-seeking mobile device 920. The current operational data may include, for example, the location of the service-seeking mobile device 920, the network of the service-seeking mobile device 920, the time of the day at the location of the service-seeking mobile device 920, the day of the week, and/or any other suitable metrics available to the serving application 902 or provided to the serving application 902 by the service-seeking mobile device 920.

The network performance module 200 receives the request for a network performance estimate from the serving application 902 and determines a network performance estimate based on the operational data provided in the request for the network performance estimate. The network performance module 200 can return the network performance estimate to the serving application 902. The serving application 902 can receive the network performance estimate and adjust service to the service-seeking mobile device 920 accordingly.

It should be appreciated that in these embodiments, the network performance module 200 can be implemented at a server that is remote to the application server 900 or may be implemented at the application server 900.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code, or a process executed by a distributed network of processors and storage in networked clusters or datacenters; other suitable components that provide the described functionality; or a combination of some or all of the above, such as in a system-on-chip. The term module may include memory (shared, dedicated, or group) that stores code executed by the one or more processors.

The term code, as used above, may include software, firmware, bytecode and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. A computer implemented method for estimating network performance of a mobile device, comprising:

receiving operational data corresponding to one or more previously performed network operations, the operational data including:

a) network condition data indicative of a condition of a network during performance of the previously performed network operation, the network condition data including signal strength at an antenna of a device that performed the previously performed network operation, b) physical state data indicative of a physical condition of the device during performance of the previously performed network operation, the physical state data indicating a geographic location of the device, a speed of the device, and whether the device was indoors or outdoors, and c) realized network performance data indicative of at least one of a realized throughput and a realized network delay of the previously performed network operation;

generating a performance log entry corresponding to each of the previously performed network operations based on the received operational data;

storing each performance log entry in a network performance database;

receiving a request for a network performance estimate from the mobile device, the request including:

a) current network condition data of the mobile device indicative of a current condition of the network at a time corresponding to the request, the current network condition data including a current signal strength at the antenna of the mobile device, and b) current physical state data indicative of a current physical condition of the mobile device at the time corresponding to the request, the current physical state data indicating a geographic location of the mobile device, a speed of the mobile device, and whether the mobile device is indoors or outdoors;
performing a nearest neighbor search on the network performance database using the current network condition data and the current physical state data received in the request;
receiving realized network performance data of K previously performed network operations, wherein K is an integer and wherein the K previously performed network operations are selected based on a degree of similarity between the network condition data and physical state data of the K previously performed network operations and the current network condition data and the current physical state data; and
determining the network performance estimate based on the current network condition data, the current physical state data, and the realized network performance data, the network performance estimate indicating at least one of an estimated throughput and an estimated delay of the network operation to be performed.

2. The method of claim 1, wherein:
the network condition data further includes at least one of a connection type that indicates a type of network connection used to perform the previously performed network operation and an identifier of a network provider, and
the current network condition data further includes at least one of a current connection type of the mobile device and an identifier of a current network provider.

3. The method of claim 1, wherein the method is executed by the processor of the mobile device.

4. The method of claim 1, wherein the method is executed by a processor of a performance analysis server, wherein the performance analysis server is remote to the mobile device and wherein the performance analysis server receives operational data from a plurality of mobile devices.

5. The method of claim 4, wherein the operational data further includes device data indicative of specifications of the device that performed the previously performed network operation, the request includes current mobile device data indicative of specifications of the mobile device, and the network performance estimate is further based on the current mobile device data.

6. The method of claim 5, wherein:
the device data includes at least one of a model type of the device, an operating system version executing on the device, and a device driver version of the antenna used to perform the previously performed network operation, and
the current mobile device data includes at least one of a current model type of the mobile device, a current operating system version executing on the mobile device, and a current device driver version of the antenna of the mobile device.

7. The method of claim 4, further comprising:
aggregating operational data from the plurality of mobile devices, wherein the network performance estimate is based on the aggregated operational data of the plurality of mobile devices.

8. A computer implemented method, comprising:
receiving, by a computing device having one or more processors, a request for a network performance estimate of a mobile device from a requestor,
determining, by the computing device, current network condition data of the mobile device, the current network condition data being indicative of a current condition of a network at a current time of the request, the current network condition data including a current signal strength at an antenna of the mobile device;
determining, by the computing device, current physical state data of the mobile device, the current physical state data being indicative of a current physical condition of the mobile device at the current time of the request, the current physical state data indicating a geographic location of the mobile device, a speed of the mobile device, and whether the mobile device is indoors or outdoors;
accessing, by the computing device, a plurality of performance log entries in a network performance database, each of the plurality of performance log entries including: (a) previous network condition data corresponding to a previously performed network operation, the previous network condition data including a previous signal strength at a time of the previously performed network operation, (b) previous physical state data corresponding to the previously performed network operation, the previous physical state data indicating a geographic location and a speed of the device that performed the previously performed network operation, and whether the device was indoors or outdoors, and (c) realized network performance data indicative of at least one of a realized throughput and a realized network delay of the previously performed network operation;
performing a nearest neighbor search on the network performance database using the current network condition data and the current physical state data;
identifying, by the computing device, one or more performance log entries based on a degree of similarity between the current network condition data and the current physical state data and the previous network condition data and the previous physical state data of previously performed network operations;
determining, by the computing device, the network performance estimate based on the one or more identified performance log entries; and
providing, by the computing device, the network performance estimate to the requestor.

9. The method of claim 8, wherein:
the current network condition data further includes a first network on which a network operation is to be performed; and
the previous network condition data further includes a second network on which the previously performed network operation was performed.

10. The method of claim 8, wherein:
the current network condition data further includes at least one of a current connection type of the mobile device and an identifier of a current network provider, and
the previous network condition data further includes at least one of a connection type that indicates a type of network connection used to perform the previously performed network operation and an identifier of a network provider.

11. The method of claim 8, wherein the current network condition data and the current physical state data are received in the request for the network performance estimate.

12. The method of claim 8, wherein the requestor is the mobile device.

13. The method of claim 8, wherein the requestor is a server that is remote from the mobile device.

14. The method of claim 8, wherein:
the current physical state data of the mobile device includes current device data indicative of specifications of the mobile device; and the previous physical state data includes device data indicative of specifications of the device that performed the previously performed network operation.

15. A computing device having one or more processors and a non-transitory computer-readable medium storing computer-executable instructions for estimating network performance of a mobile device, the computer-executable instructions, when executed by the one or more processors, causing the computing device to perform operations comprising:
  receiving operational data corresponding to one or more previously performed network operations, the operational data including:
    a) network condition data indicative of a condition of a network during performance of the previously performed network operation, the network condition data including signal strength at an antenna of a device that performed the previously performed network operation,
    b) physical state data indicative of a physical condition of the device during performance of the previously performed network operation, the physical state data indicating a geographic location of the device, a speed of the device, and whether the device was indoors or outdoors, and
    c) realized network performance data indicative of at least one of a realized throughput and a realized network delay of the previously performed network operation;
  generating a performance log entry corresponding to each of the previously performed network operations based on the received operational data;
  storing each performance log entry in a network performance database;
  receiving a request for a network performance estimate from the mobile device, the request including:
    a) current network condition data of the mobile device indicative of a current condition of the network at a time corresponding to the request, the current network condition data including a current signal strength at the antenna of the mobile device, and
    b) current physical state data indicative of a current physical condition of the mobile device at the time corresponding to the request, the current physical state data indicating a geographic location of the mobile device, a speed of the mobile device, and whether the mobile device is indoors or outdoors;
  performing a nearest neighbor search on the network performance database using the current network condition data and the current physical state data received in the request;
  receiving realized network performance data of K previously performed network operations, wherein K is an integer and wherein the K previously performed network operations are selected based on a degree of similarity between the network condition data and physical state data of the K previously performed network operations and the current network condition data and the current physical state data; and
  determining the network performance estimate based on the current network condition data, the current physical state data, and the realized network performance data, the network performance estimate indicating at least one of an estimated throughput and an estimated delay of the network operation to be performed.

16. The computing device of claim 15, wherein:
  the network condition data further includes at least one of a connection type that indicates a type of network connection used to perform the previously performed network operation and an identifier of a network provider, and
  the current network condition data further includes at least one of a current connection type of the mobile device and an identifier of a current network provider.

17. The computing device of claim 15, wherein the computing device is the mobile device.

18. The computing device of claim 15, wherein the computing device is a server, wherein the server is remote to the mobile device and wherein the server receives operational data from a plurality of mobile devices.

19. The computing device of claim 18, wherein the operational data further includes device data indicative of specifications of the device that performed the previously performed network operation, the request includes current mobile device data indicative of specifications of the mobile device, and the network performance estimate is further based on the current mobile device data.

20. The computing device of claim 19, wherein:
  the device data includes at least one of a model type of the device, an operating system version executing on the device, and a device driver version of the antenna used to perform the previously performed network operation, and
  the current mobile device data includes at least one of a current model type of the mobile device, a current operating system version executing on the mobile device, and a current device driver version of the antenna of the mobile device.

21. The computing device of claim 18, wherein the operations further include:
  aggregating operational data from the plurality of mobile devices, wherein the network performance estimate is based on the aggregated operational data of the plurality of mobile devices.

22. The computing device of claim 15, wherein the network performance database is organized into a plurality of bins, each bin corresponding to a different combination of network condition data values and physical condition values and the plurality of performance log entries are each based on corresponding realized network performance data, such that a new performance log entry based on new realized network performance data associated with a new performed network operation is stored in a particular bin based on new network condition data and new physical state data corresponding to the new performed network operation and a particular combination of particular network condition data values and particular physical condition values corresponding to the particular bin.

23. The computing device of claim 22, wherein determining the network performance estimate further comprises:
  identifying one of the plurality of bins based on the current network condition data and the current physical state data; and
  determining the network performance estimate based on one or more performance log entries stored in the identified bin.

24. A computing device having one or more processors and a non-transitory computer-readable medium storing computer-executable instructions for estimating network performance of a service-seeking mobile device, the computer-executable instructions, when executed by the one or more processors, causing the computing device to perform the operations comprising:

receiving operational data corresponding to a previously performed network operation performed by a reporting mobile device, the operational data including:
  a) network condition data indicative of a condition of a network during performance of the previously performed network operation, the network condition data including signal strength at an antenna of the reporting mobile device,
  b) physical state data indicative of a physical condition of the reporting mobile device during performance of the previously performed network operation, the physical state data indicating a geographic location of the reporting mobile device, a speed of the reporting mobile device, and whether the reporting mobile device was indoors or outdoors, and
  c) realized network performance data indicative of at least one of a realized throughput and a realized network delay of the previously performed network operation;
generating a performance log entry corresponding to each of the previously performed network operations based on the received operational data;
storing the performance log entry in a network performance database that stores a plurality of performance log entries corresponding to a plurality of reporting mobile devices including the reporting mobile device, each one of the performance log entries being based on operational data corresponding to a different previously performed network operation performed by one of the plurality of reporting mobile devices;
receiving a request for a network performance estimate from an application server that is to serve the service-seeking mobile device, the request including:
  a) current network condition data of the service-seeking mobile device indicative of a current condition of the network at a time corresponding to the request, the current network condition data including a current signal strength at the antenna of the service-seeking mobile device, and
  b) current physical state data indicative of a current physical condition of the service-seeking mobile device at the time corresponding to the request, the current physical state data indicating a geographic location of the service-seeking mobile device, a speed of the service-seeking mobile device, and whether the service-seeking mobile device is indoors or outdoors;
performing a nearest neighbor search on the network performance database using the current network condition data and the current physical state data received in the request;
receiving realized network performance data of K previously performed network operations, wherein K is an integer and wherein the K previously performed network operations are selected based on a degree of similarity between the network condition data and physical state data of the K previously performed network operations and the current network condition data and the current physical state data;

determining the network performance estimate based on the current network condition data, the current physical state data, and the realized network performance data, the network performance estimate indicating at least one of an estimated throughput and an estimated delay of the network operation to be performed; and providing the network performance estimate to the application server.

25. The computing device of claim 24, wherein:
the network condition data further includes at least one of a connection type that indicates a type of network connection used to perform the previously performed network operation and an identifier of a network provider, and
the current network condition data further includes at least one of a current connection type of the service-seeking mobile device and an identifier of a current network provider.

26. The computing device of claim 24, wherein:
the computing device is a server that is remote to the plurality of reporting mobile devices and the application server, and
the server receives operational data from the plurality of reporting mobile devices.

27. The computing device of claim 26, wherein the operations further comprise:
aggregating performance log entries from the plurality of reporting mobile devices based on the operational data received therefrom; and
determining the network performance estimate based on the aggregated performance log entries.

28. The computing device of claim 24, wherein the request is received from an application executing on the application server, wherein the application server is to serve the service-seeking mobile device.

29. The computing device of claim 24, wherein the operational data further includes device data indicative of specifications of the reporting mobile device, the request includes current mobile device data indicative of specifications of the service-seeking mobile device mobile device, and the network performance estimate is further based on the current mobile device data.

30. The computing device of claim 29, wherein:
the device data includes at least one of a model type of the reporting mobile device, an operating system version executing on the reporting mobile device, and a device driver version of the antenna used to perform the previously performed network operation, and
the current mobile device data includes at least one of a current model type of the service-seeking mobile device, a current operating system version executing on the service-seeking mobile device, and a current device driver version of the antenna of the service-seeking mobile device.

* * * * *